S. B. Jerome,

Cigar Mold.

No. 107,266.  Patented Sep. 13, 1870.

United States Patent Office.

SAMUEL B. JEROME, OF NEW HAVEN, CONNECTICUT, ASSIGNOR TO "SAMUEL PECK & CO.," OF SAME PLACE.

Letters Patent No. 107,266, dated September 13, 1870.

IMPROVEMENT IN MOLDS FOR DRYING CIGAR-FILLINGS.

The Schedule referred to in these Letters Patent and making part of the same.

*To all whom it may concern:*

Be it known that I, SAMUEL B. JEROME, of New Haven, in the county of New Haven and State of Connecticut, have invented certain new and useful Improvements in Cigar-Holders, for use in the manufacture of cigars, of which the following is a specification.

My invention relates to devices for receiving and holding cigar-fillings, or the inner portions of cigars, and absorbing the moisture therefrom prior to the putting on of the wrappers.

The inner portion of the cigar, termed the filling, whether made by hand or in a machine, is usually quite moist after being rolled and shaped, and it is desirable to employ some means of taking up and speedily absorbing the moisture prior to the application of the wrapper.

If a wooden holder were employed, it would soon become swollen, owing to the moisture absorbed by it, and consequently unfitted for use; and, if the holder were made of a non-absorbent material, while it would not swell, yet it would, of course, fail to take up the moisture of the cigar, which would consequently come out of it too wet.

It is, therefore, necessary for the holder to combine in itself two qualifications, viz.: it should absorb the moisture from the cigar, and yet should not swell so as to be unfitted for use.

My object is to produce a holder of this kind, and to this end

My invention consists of a cigar-holder, made of a composition such as hereinafter described, or other material impermeable to water, provided with a lining of straw-board, or other suitable absorbent, for taking up the moisture of the cigar or filling placed in said holder.

The manner in which my invention is or may be carried into effect will be readily understood by reference to the accompanying drawing, in which—

I prefer to make the body *a* of the holder of a composition composed of shellac and resin, mixed with suitable coloring matter, and with sawdust or fibrous material, to prevent the composition from being too brittle.

This composition is now in use for the manufacture of knobs, frames, &c., and the holder can be readily molded from it. But in lieu of this composition, any other suitable composition may be used, or, indeed, any other suitable material which is impermeable to water.

Figure 1:
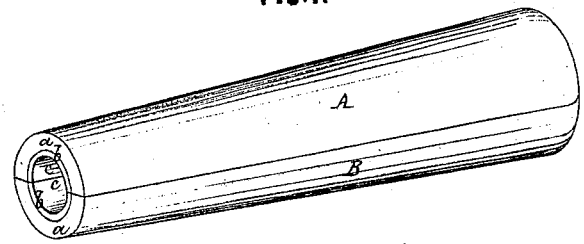
Figure 1 is a perspective view of a cigar-holder made in accordance with my invention.
Figure 2:
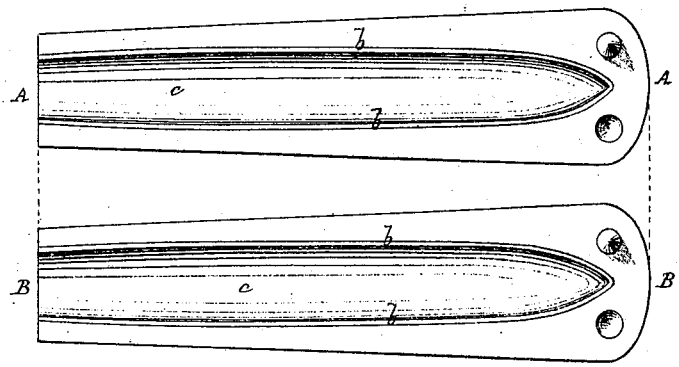
Figure 2 is a plan view of the two parts of which the holder is composed.
Figure 3:
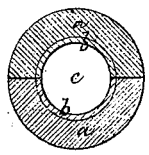
Figure 3 is a transverse section of one of the parts of the holder.

The holder is made of two sections or parts, A B, fig. 2, which are molded or otherwise formed separately, the one being a counterpart of the other in shape and size; and in each section is formed a half mold, *c*, of the cigar or filling which the holder is designed to receive, so that, when the two parts are placed together, as shown in fig. 1, they will form a holder, the core of which is of the exact shape and size of the cigar.

The flat faces of the sections A B are provided each with a pin and a socket, so that, when the sections are put together, the pin on the one will fit in the socket in the other, and thus hold the two accurately together, preventing any lateral displacement. The exterior of the sections is of such shape that, when they are put together, the holder will be tapering, or approaching a truncated cone in shape.

One end of the holder, where the tip of the cigar is located, is closed when the sections are put together, and the other end is open.

The recess or half mold *c* in each section is lined with straw-board or paper, or other suitable absorbent material, *b*, for the purpose of taking up the moisture from the cigar. This lining, when the holder is made of composition, is united with the section, by being pressed and molded with the same while the composition is in a plastic state. But it may be attached in other ways, according to the nature of the material used in making the body of the holder.

The lining takes up and absorbs readily the moisture from the cigar-filling, and may be of any thickness desired.

The manner in which the holder is used is as follows:

After the cigar-filling has been made, either by machinery or otherwise, it is put in the half mold *c* of one section of the holder. The other section is then put on so as to cover the cigar, and the holder is then stuck into a board, in which any desired number of holes has been made, the holes being of sufficient size to allow the holders to pass about half way through the board. Their tapering form will thus allow them to be jammed in the holes, so as to hold the sections firmly together, and to press them tightly upon the cigar-filling. After remaining there a suitable time, the holder is taken out of the board and the tobacco or cigar-filling removed from the holder, the moisture having been sufficiently absorbed by the lining *b*. The filling retains the form of the cigar which the mold *c* in the interior of the holder imparts to it, and is then ready to receive the wrapper.

I have thus described the manner in which the holder may be used; but I desire to be understood as making no claim to such peculiar manner of using the holder, my invention being confined to the construction of the holder itself.

Having now described my invention and the manner in which the same is or may be carried into effect,

What I claim, and desire to secure by Letters Patent, is—

1. A cigar-holder made of a composition substantially such as described, or other material impermeable to water, and provided with a lining of straw-board or other suitable absorbent for taking up the moisture of the cigar or filling placed in said holder, substantially as set forth.

2. A cigar-holder formed in two sections, of composition impermeable to water, molded in the shape substantially as shown and described, with a lining of straw-board or other absorbent material pressed and united with said section while the composition is in a plastic state, as set forth.

In testimony whereof I have signed my name to this specification before two subscribing witnesses.

SAMUEL B. JEROME.

Witnesses:
CARLOS SMITH,
JOSEPH A. NICHOLS.